June 6, 1967     E. W. BRINKMAN     3,323,398

SCREW MACHINE ATTACHMENT

Filed May 3, 1965     3 Sheets-Sheet 1

INVENTOR.
EARL W. BRINKMAN
BY
ATTORNEY

June 6, 1967 E. W. BRINKMAN 3,323,398
SCREW MACHINE ATTACHMENT

Filed May 3, 1965 3 Sheets-Sheet 3

INVENTOR.
EARL W. BRINKMAN
BY
ATTORNEY

3,323,398
SCREW MACHINE ATTACHMENT

Earl W. Brinkman, Rochester, N.Y., assignor to Davenport Machine Tool Company, Inc., Rochester, N.Y., a corporation of New York
Filed May 3, 1965, Ser. No. 452,724
12 Claims. (Cl. 82—34)

This invention relates to screw machines, and more particularly to an attachment for a screw machine for removing burrs from a piece that has previously been formed in the machine.

In forming a hexagonal surface on a workpiece in a screw machine the forming tool usually throws up a burr which has to be removed before the workpiece can be used.

One object of this invention is to provide means for automatically removing burrs from a workpiece in a screw machine as one step in the operation of such a machine.

Another object of this invention is to provide for machines of the type described, an attachment for safely removing burrs that are formed on a piece of rotating stock during the machining thereof.

A more specific object of this invention is to provide an attachment for removing burrs from a workpiece automatically in the sequence of operation of a screw machine by engaging a tool momentarily with the stock, between operations of other tools employed in machining the stock into the desired configuration.

Still another object of the invention is to provide a deburring attachment for screw machines which will enable a relatively inexpensive deburring tool to be used and which at the same time will insure long life for the tool.

Other objects of the invention will be apparent hereinafter from the specification and from the recital of the appended claims, particularly when read in conjunction with the accompanying drawings.

Figure 1:
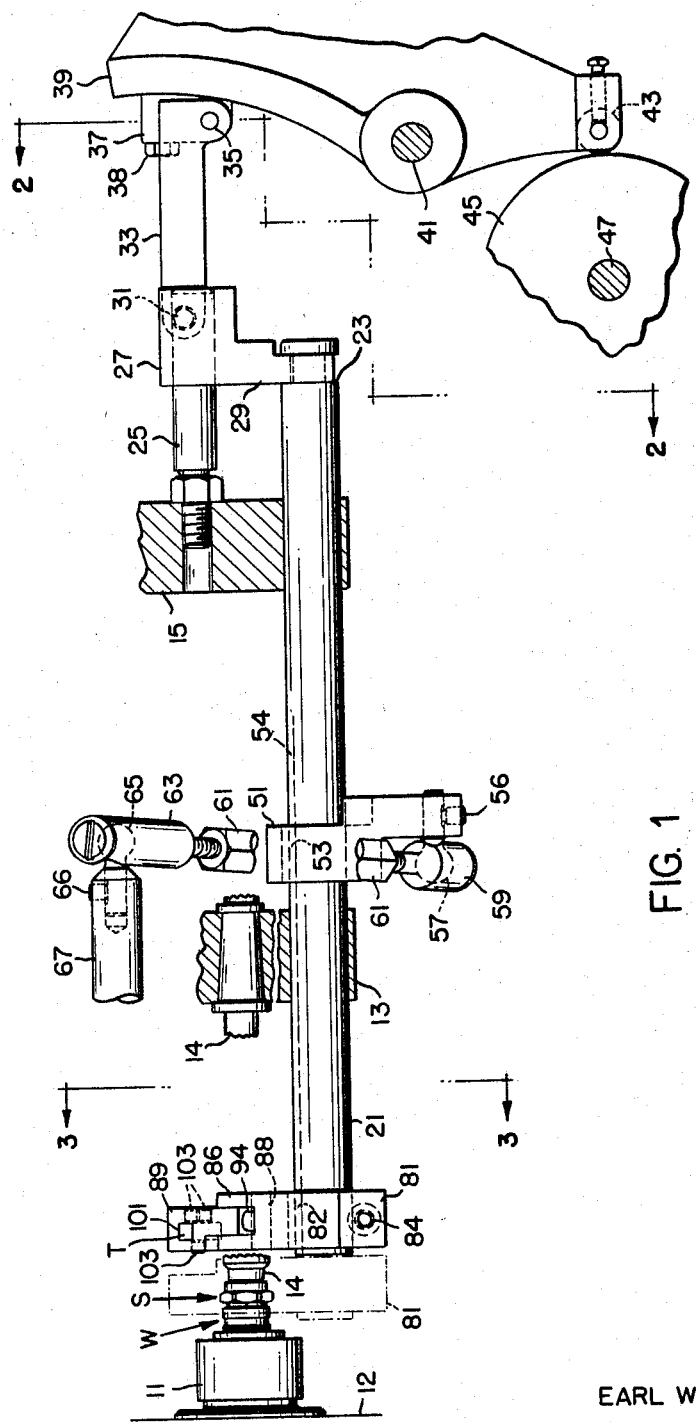
FIG. 1 is a fragmentary elevational view of an automatic screw machine provided with a burr-removing attachment made in accordance with one embodiment of this invention, part of the attachment being cut away for clarity.

With the attachment of this invention during the final portion of a finish-forming operation on a hexagonal or other polygonally-shaped portion of a workpiece, a deburring tool is introduced into engagement with the workpiece, and as the workpiece continues to revolve this tool removes first the burrs formed on one end face of the finish formed polygonal portions of the workpiece, and then the burrs formed on the other end face of this polygonal portion.

Referring now to the drawings by numerals of reference, the already partly machined piece of stock, from which the burrs are to be removed, is denoted generally at W. The portion of this workpiece, which is actually to be deburred, is designated S. It is polygonal shape in cross section (here shown as the hexagonal portion provided on a sparkplug for gripping with a wrench to thread the plug into an engine block). The workpiece is rotatably supported in conventional fashion at one end by one spindle 11 of the indexible turret head or spindle carrier 12 of the screw machine, and at its opposite end by member 14 (FIG. 1) which projects from one of two, spaced arms 13 and 15 (FIG. 1) which are supported by the frame of the machine.

Rotatable and axially slidable in aligned bores in the arms 13 and 15, and extending parallel to the axis of spindle 11, is a shaft 21. At its rear end (its right end in FIG. 1) the shaft 21 projects beyond the arm 15, and has an annular recess 23 formed in its peripheral surface. Adjustably threaded at one end into the arm 15, and projecting rearwardly therefrom above and parallel to the shaft 21, is a guide rod 25. Mounted for axial sliding movement on the rearwardly projecting end of the rod 25 is a yoke block 27. The lower end of block 27 is bifurcated as denoted at 29 (FIG. 3), and engages in the annular recess 23 of shaft 21 to effect axial shifting movement of shaft 21 upon axial movement of block 27.

Figure 3:
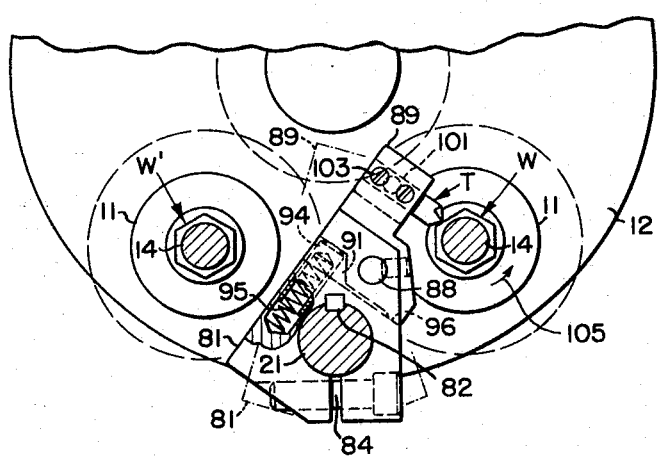
FIG. 3 is a fragmentary sectional view taken along the line 3—3 in FIG. 1 looking in the direction of the arrows.

Pivotally connected by a pin 31 to block 27 at one end thereof is a link 33 (FIG. 3). At its opposite end link 33 is pivotally connected by a pin 35 to a shoe or block 37, which is adjustably connected by a bolt 38 (FIG. 1) to the upper end of a rocker arm 39. Intermediate its ends arm 39 is mounted to pivot about a stationary shaft 41, which is mounted in the screw machine frame (not illustrated) at right angles to the shaft 21. At its lower end arm 39 carries a rotatable cam follower 43, which has rolling engagement with the peripheral surface of a rotatable disc cam 45 (only part of which is illustrated in FIG. 1), which is mounted on a cam shaft 47 journaled in the machine frame parallel to shaft 41.

Figure 2:
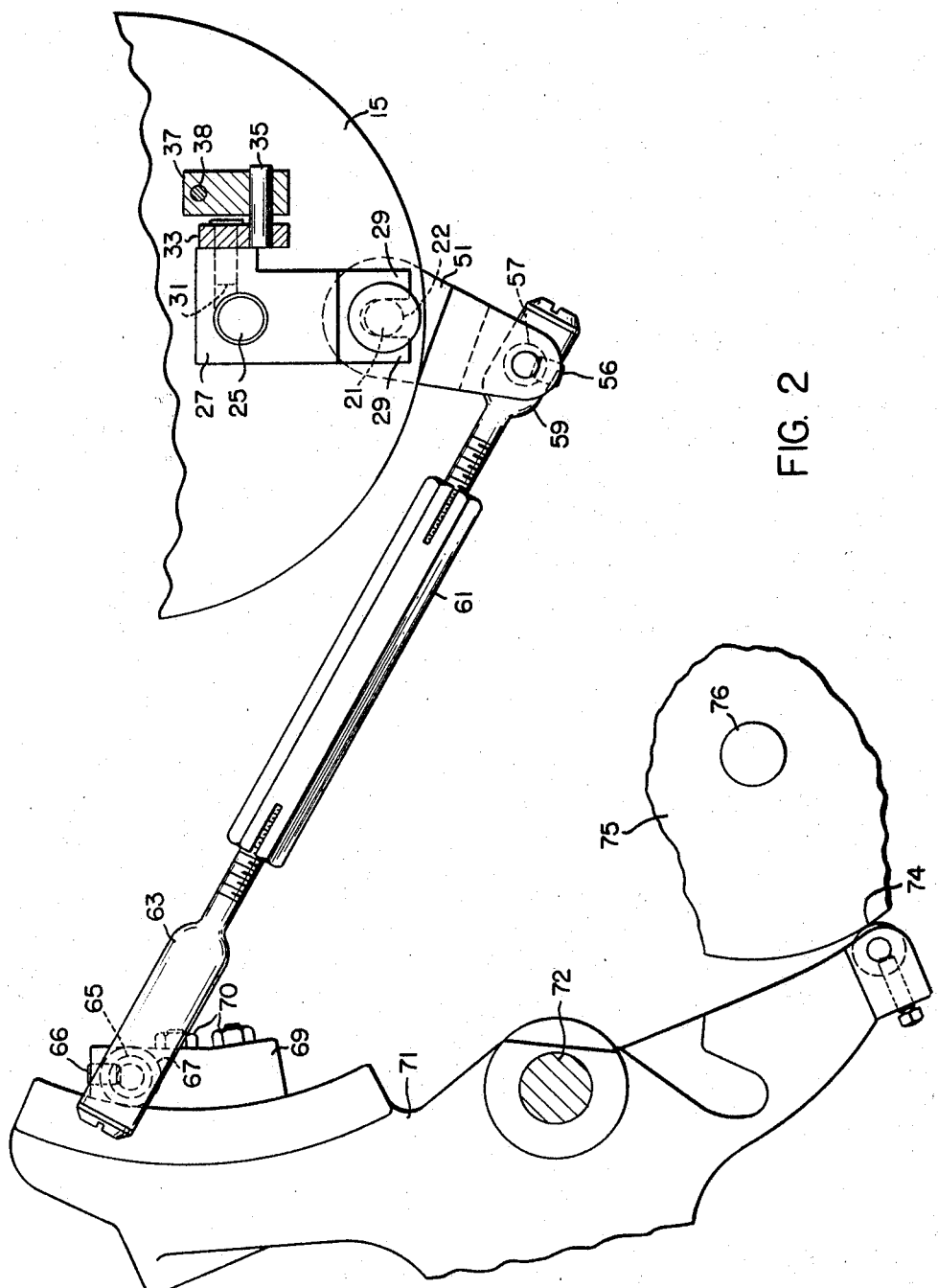
FIG. 2 is a fragmentary sectional view taken along the line 2—2 in FIG. 1 looking in the direction of the arrows, and showing the part of the attachment which was cut away in FIG. 1.

Mounted at its upper end on the shaft 21 between the arms 13 and 15, and secured against movement on shaft 21 by a setscrew (not illustrated), and a key 53 (FIG. 1), is a rocker arm 51. Secured by a setscrew 56 to the laterally offset, lower end of the arm 51, and projecting from the forward face thereof is a ball-headed pin 57. Connected at its lower end to the head of the pin 57 for universal movement relative thereto by means of a coupling member 59 is a turnbuckle 61. At its upper end, turnbuckle 61 is connected by a further coupling member 63 to a further ball-headed pin 65, which is secured by a setscrew 66 in one end of a rod 67 (FIG. 1). At its opposite end rod 67 is secured to one side of a block or shoe 69 (FIG. 2), which is adjustably secured by bolts 70 to the upper end of a rocker arm 71. Intermediate its ends the arm 71 is mounted to pivot about a stationary shaft 72, which is mounted in the machine frame (not illustrated) parallel to the shaft 21. Rotatably mounted in the lower end of the arm 71 is a cam roller follower 74, which has rolling engagement with the periphery of a cam 75. Cam 75 is secured to a cam shaft 76 journaled in the machine frame for rotation about an axis which extends parallel to shafts 21 and 72.

Mounted on the forward end of shaft 21 (FIG. 1) for rotation therewith, and for axial adjustment therealong, is a block 81. Block 81 is held against rotation relative to shaft 21 by means of a key 82 (FIG. 3). Block 81 is split at its lower end as shown in FIG. 3, to have a split clamp connection with shaft 21. A screw 84, which threads into the block 81, serves to tighten the block on shaft 21. At its upper end block 81 is bifurcated as denoted at 86 (FIG. 1), and between the furcations there is pivotally mounted by pin 88 a tool-holding block 89. The lower edge of the block 89 has therein a recess 91; and reciprocable in the block 81 in registry with this recess is a spring-pressed plunger 94, the upper end of which is constantly urged into engagement with block 89 by a coiled compression spring 95. Thereby the block 89 is constantly urged in a clockwise direction about the pin 88 as shown in FIG. 3. A lug 96 (FIG. 3) formed on the lower edge of the block 89 limits the clockwise movement of block 89 about the pin 88.

Figure 4:
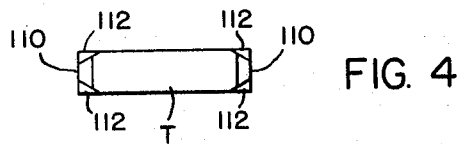
FIGS. 4, 5 and 6 are a plan view, a side elevation, and an end view, respectively, of a preferred form of deburring tool used on this attachment.
Figure 5:
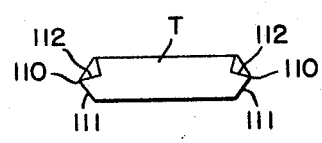
Figure 6:
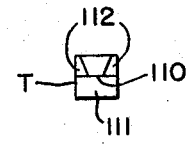

The deburring tool T is adjustably mounted in a rectangular opening 101 in the upper end of block 89. Tool T is generally rectangular in cross section as shown in FIGS. 4, 5 and 6. It is secured against movement in the opening 101 by set screws 103, which are threaded in block 89.

The inoperative positions of blocks 81 and 89 are indicated in full lines in FIG. 1, and by broken lines in FIG. 3. At this time the tool T is radially and axially spaced from the stock W, so as not to interfere with any indexing of the spindle carrier 12; and the shaft 21 is disposed in its extreme right hand, or full line position as shown in FIG. 1.

During the last portion of the finish forming of the hexagonal portion S of the work, the cam 45 causes the arm 39 to pivot slightly counterclockwise about shaft 41, thereby causing the link 33 and the yoke block 27 (FIGS. 1 and 2) to shift the shaft 21 axially, to move the blocks 81 and 89 carried thereby, from their solid to their broken line position in FIG. 1, so that the tool T registers with one end (the right end in FIG. 1) of the hexagonal surface S on the work W. Thereafter the cam 75 permits the arm 71 to rotate slightly counterclockwise about the shaft 72 in FIG. 2, thereby drawing the turnbuckle 61 to the left, and causing the arm 51 to rotate the shaft 21 slightly clockwise about its axis, so that the blocks 81 and 89 are rotated clockwise from their broken line position to their solid line position in FIG. 3, bringing the tool T into resilient engagement with the right hand face (FIG. 1) of the hexagonal portion S on the work W, so that as the work revolves in the direction of the arrow 105 (FIG. 3) the burrs are removed from this end surface of the work.

The spring 95 permits the tool block 89 to swing slightly counterclockwise (FIG. 3) about the pin 88 in the event that the tool strikes any particularly heavy burrs. This prevents undesirable gouging of the surface S. Ordinarily the cams 45 and 75 will maintain the tool T in engagement with this one end face of the work W only for approximately one revolution thereof.

After approximately one revolution of the work W, the cam 75 pivots the arm 71 (FIG. 2) in a direction to disengage the tool from the work W. The cam 45 then pivots the arm 39 slightly further in the direction to shift the shaft 21, and the blocks 81 and 89 slightly further to the left from their broken line positions shown in FIG. 1, thereby to register the tool T with the opposite, or left hand end face of the hexagonal portion S of the work. The cam 75 then once again permits the arm 71 to rotate counterclockwise about the shaft 72 in FIG. 2, thereby once again drawing the turnbuckle 61 to the left, and causing the arm 51 to rotate the shaft 21 clockwise about its axis as shown in FIGS. 2 and 3, thereby once again rotating the blocks 81 and 89 clockwise in FIG. 3 from their broken to their solid line positions. This last movement engages the tool T with the left hand end face (FIG. 1) of the hexagonal portion S; and as the work continues to revolve the burrs are removed from this end face of the work. After one, or a desired number of revolutions of the work, the blocks 81 and 89 are returned to their broken line positions (FIG. 3) by the cam 75; and the cam 45 permits the arm 39 to pivot in the direction to shift the shaft 21 to the right in FIG. 1, to return the blocks 81 and 89, and the tool T to their inoperative, solid line positions. The tool T remains in its inoperative position until a subsequent piece of work or stock W' has been indexed to the finish forming position for its hexagonal portion S, and has had that portion almost completely finish-formed and moved into position to be deburred. Thereafter the burrs are removed from the new piece of work in the manner above described.

From the foregoing it will be apparent that the present invention constitutes a relatively simple and effective means of removing undesirable burrs from a rotating piece of stock without unduly interrupting the normal series of machining operations performed on the stock. By spring-loading the tool T for resilient, limited pivotal movement about the pin 88, any undesirable gouging of the work or stock is prevented during the removal of the burrs therefrom.

As shown in FIGS. 4 to 6, inclusive, identical cutting surfaces are formed on opposite ends of the deburring tool T, so that when the cutting surface at one end thereof is dulled, the tool need only be reversed in block 89 to dispose a new cutting edge in operating position. The tool is solid and is radially ground as at 111 below each of its cutting edges 110. The ends of the tool further have a negative rake of approximately 15° back of the cutting edges as denoted at 112. The amount of rake will vary, of course; with the type of work to be done. The tool may be made of tungsten carbide or any other suitable material. Since the tool T engages the stock or work ordinarily for only two revolutions in a deburring operation on a particular workpiece, the tool does not rub on the work for too long a time in a deburring operation on a particular workpiece. Thus, wear on the cutting edge of the tool is minimized.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. In a machine having a spindle for holding and rotating a piece of stock, an attachment for removing burrs from the rotating stock, comprising
   (a) a first member mounted on said machine adjacent said spindle for pivotal movement about an axis parallel to the axis of rotation of said spindle,
   (b) a second member connected to said first member for movement thereby between operative and inoperative positions, respectively, and for limited pivotal movement relative to said first member about an axis parallel to the axis of rotation of said spindle,
   (c) means for constantly urging said second member resiliently in one direction about its pivotal axis to move it toward one of its limit positions relative to said first member, and
   (d) a deburring tool removably secured to said second member and having a cutting edge at one end thereof resiliently engageable with the stock upon movement of said second member to its operative position.

2. A machine as defined in claim 1, including
   (a) means for intermittently oscillating said first member about its pivotal axis, and
   (b) means for shifting said first member in a direction parallel to its pivotal axis after each oscillation thereof.

3. In a machine having a spindle for holding and rotating a piece of stock, an attachment for removing burrs from the rotating stock, comprising
   (a) a first member movably mounted on said machine,
   (b) a second member connected to said first member for limited movement relative thereto,
   (c) means on said machine for intermittently moving said members in unison into and out of an operative position relative to the stock in said spindle,
   (d) a deburring tool removably secured to said second member and having a cutting edge at one end thereof engageable with the rotating stock in said spindle each time said members are moved to said operative position, and
   (e) resilient means interposed between said first and second members and operative to hold the tool carried by said second member resiliently in engagement with the stock in said spindle, when said members are in said operative position.

4. In a machine having a spindle for holding and rotating a piece of stock, an attachment for removing burrs from the rotating stock, comprising
(a) a shaft mounted on said machine adjacent said spindle to pivot about an axis which extends parallel to the axis of said spindle,
(b) a first member secured to said shaft for movement therewith,
(c) a second member mounted on said first member for limited pivotal movement relative thereto about an axis which extends parallel to said spindle axis,
(d) a deburring tool removably secured to said second member and having a cutting edge at one end thereof engageable with the stock in said spindle upon pivoting of said shaft in one direction, and disengageable from the stock upon pivoting of said shaft in the opposite direction, and
(e) a spring connected to said second member to urge it toward one of its extreme pivotal positions into operative engagement with the stock, and operative, when said tool is engaged with said stock to permit slight swinging movement of said tool away from said stock against the resistance of said spring.

5. In a machine having a spindle for holding and rotating a workpiece, an attachment for removing burrs from the workpiece at axially spaced points therealong, comprising
(a) a shaft mounted parallel to the axis of rotation of said spindle,
(b) means for shifting said shaft axially between an inactive position and a plurality of active positions,
(c) a deburring tool having a cutting edge at one end thereof,
(d) means mounting said tool on said shaft to be axially spaced from said stock, when said shaft is in its inactive position, and to register with one of said spaced points along the stock, when said shaft is in one of its active positions, and
(e) means for pivoting said shaft in opposite directions about its axis each time said shaft moves to one of its active positions to move said tool cutting edge into engagement with the workpiece each time said shaft is pivoted in one direction, and to carry said cutting edge out of engagement with the workpiece, when said shaft is pivoted in the opposite direction.

6. In a machine as defined in claim 5, wherein said mounting means comprises
(a) a first block secured on said shaft,
(b) a second block pivoted on said first block for limited movement relative thereto about an axis which extends parallel to said shaft, and
(c) a spring seated at opposite ends in cooperating recesses formed in said first block and said second block, respectively, and operative to urge said second block in said one direction.

7. In an automatic screw machine, wherein a workpiece is mounted in a rotary work spindle in a rotary turret that is indexable from station to station to bring the workpiece successively into engagement with different tools, an attachment comprising
(a) a support reciprocable rectilinearly in a direction parallel to the axis of the work spindle and pivotal about a second axis also parallel to the axis of the work spindle,
(b) a block mounted on said support for pivotal movement about an axis parallel to said second axis,
(c) a tool mounted on said block,
(d) means for controlling the reciprocatory and pivotal movements of said support to move said support rectilinearly forwardly in one direction from an inoperative position first to an operative position at one side of a workpiece mounted on said spindle, to then swing said support in one direction about said second axis to bring said tool into operative relation to the workpiece, to swing said support, after a predetermined number of rotations of the work spindle, in its opposite direction of pivotal movement to swing the tool away from the workpiece, to then move said support further in said forward direction to bring the tool into an operative position at the other side of the workpiece, to then swing the support in said one direction about said second axis to bring the tool again into operative engagement with the workpiece, and then, after a second predetermined number of revolutions of the workpiece to swing said support in its said opposite direction of pivotal movement to disengage the tool from the workpiece, and then to move said support rectilinearly rearwardly in the direction opposite to said forward direction to return it to inoperative position, and
(e) means for constantly urging said block in one direction about its pivot to hold said tool resiliently in engagement with the workpiece, when the tool is engaged therewith.

8. In a machine as claimed in claim 7, wherein said tool is a bar tool having a cutting edge at one end.

9. In a machine having a rotary work support, an attachment for deburring a workpiece mounted in said work support comprising,
(a) a rotary and axially movable shaft disposed parallel to the axis of said work support,
(b) a first block secured to said shaft to move therewith,
(c) a second block pivotal on said first block about and axis parallel to the axis of said work support,
(d) a tool secured in said second block,
(e) said tool being a bar having a cutting edge at one end thereof,
(f) means for reciprocating said shaft to move said tool to and from operative relation with the workpiece,
(g) means for swinging said shaft in opposite directions about its axis to move the tool to and from operative engagement with the workpiece, and
(h) means for urging said second block resiliently about its pivotal axis to hold said tool resiliently in engagement with the workpiece.

10. In a machine as claimed in claim 9 wherein said tool has negative rake back of its cutting edge.

11. In a machine as claimed in claim 10 wherein the axial movements of said shaft alternate with its pivotal movements.

12. In a machine as claimed in claim 11 wherein control means is provided for moving said shaft rectilinearly step-by-step twice in the same direction to bring the tool successively into engagement with opposite ends of the workpiece before it is moved in the opposite rectilinear direction to return the shaft to initial position.

No references cited.

WILLIAM W. DYER, JR., *Primary Examiner.*

LEONIDAS VLACHOS, *Examiner.*